(12) United States Patent
Bingham et al.

(10) Patent No.: US 11,473,026 B2
(45) Date of Patent: Oct. 18, 2022

(54) USE OF AMINALS TO REMOVE ACID GASES FROM FLUID GAS STREAMS

(71) Applicant: Foremark Performance Chemicals, League City, TX (US)

(72) Inventors: Jon Bingham, Mont Belvieu, TX (US); Marlon O. Treasure, Houston, TX (US)

(73) Assignee: Foremark Performance Chemicals, League City, TX (US)

( * ) Notice: Subject to any disclaimer, the term of this patent is extended or adjusted under 35 U.S.C. 154(b) by 203 days.

(21) Appl. No.: 16/426,366

(22) Filed: May 30, 2019

(65) Prior Publication Data

US 2019/0367829 A1 Dec. 5, 2019

Related U.S. Application Data

(60) Provisional application No. 62/678,807, filed on May 31, 2018.

(51) Int. Cl.
*C10L 3/10* (2006.01)
*B01D 53/14* (2006.01)

(52) U.S. Cl.
CPC .......... *C10L 3/103* (2013.01); *B01D 53/1462* (2013.01); *C10L 3/104* (2013.01); *B01D 2252/2041* (2013.01); *B01D 2252/20489* (2013.01)

(58) Field of Classification Search
CPC ............ C10L 3/10; C10L 3/103; B01D 53/14
See application file for complete search history.

(56) References Cited

U.S. PATENT DOCUMENTS

| | | | |
|---|---|---|---|
| 5,347,003 A * | 9/1994 | Trauffer | ................ C01B 17/22 544/8 |
| 7,938,887 B2 | 5/2011 | Rochelle | |
| 8,486,356 B2 | 7/2013 | Attalla | |
| 9,028,785 B2 | 5/2015 | Kortunov | |
| 9,034,288 B2 | 5/2015 | Baugh | |
| 9,321,007 B2 | 4/2016 | Rochelle | |
| 9,713,788 B2 | 7/2017 | Calabro | |

FOREIGN PATENT DOCUMENTS

EP    2928581    10/2016

OTHER PUBLICATIONS

Trauffer (Aminal scrubbing compounds cut TRS levels with no CO2 reaction, 1995, Pulp and Paper, vol. 69, Issue 5, pp. 121-125) (Year: 1995).*

* cited by examiner

*Primary Examiner* — Youngsul Jeong
(74) *Attorney, Agent, or Firm* — Yancy IP Law, PLLC

(57) ABSTRACT

An aminal compound is injected into a fluid gas stream including at least one acid gas to reduce the amount of acid gas in the fluid gas stream. Having two reactive sites present in the aminal compound enables a much higher efficiency of acid gas capture than a simple alkanolamine, which isn't effective, for example, under dilute circumstances.

19 Claims, No Drawings

USE OF AMINALS TO REMOVE ACID GASES FROM FLUID GAS STREAMS

CROSS REFERENCE TO RELATED APPLICATIONS

This application claims the benefit, under 35 U.S.C. 119(e), of U.S. Provisional Application No. 62/678,807 filed May 31, 2018, the contents of which are incorporated herein by reference.

BACKGROUND OF THE INVENTION

1. Field of the Invention

The invention generally relates to reducing the concentration of at least one acid gas from a fluid gas stream using at least one aminal compound.

2. Description of Related Art

Removing acid gases such as carbon dioxide or hydrogen sulfide is of great importance for numerous applications. Acid gases are not only corrosive and hazardous in the case of hydrogen sulfide. The presence of these gases can make gas stream un-usable, unsellable, or non-compliant in certain applications.

Carbon dioxide scavengers are importance to natural gas. Typically, carbon dioxide is removed using a single amine, often an alkanolamine. These amines work great in amine plants, but are expensive. Additionally, their use and efficiency in gas streams is limited compared to a diamine. In some cases diamines are used. However, they are not very affective and often produce undesirable solids.

As seen in Rxn. 1, carbon dioxide reacts with alkanolamine, but two molecules of alkanolamine are needed to scavenge the carbon dioxide. Due to dilution, a single amine does not work well injected into a fluid phase.

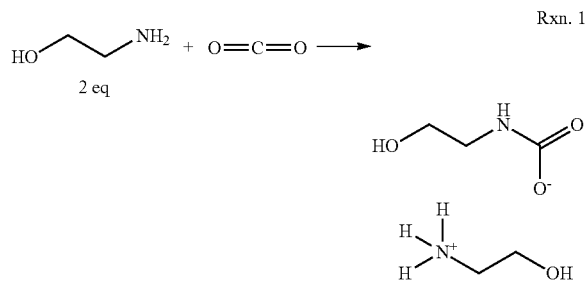

Rxn. 1

Hydrogen sulfide scavengers are well known. They often use alkanolamines as described in Rxn. 1 or bound in hexahydro triazine rings. These scavengers are used to remove excess $H_2S$ from crude oil, natural gas, and even waste treatment centers. While hexahydro triazines are great at their particular use because of their ring structure, they do not scavenge carbon dioxide well at all.

BRIEF SUMMARY OF THE INVENTION

The present invention is directed to the use of a single molecule known as an aminal compound to remove at least one acid gas from a fluid gas stream. The aminal compound has two reactive sites which enables a much higher efficiency of acid gas capture than a simple alkanolamine, which isn't effective, for example, under dilute circumstances.

DETAILED DESCRIPTION OF THE INVENTION

The present invention, according to certain embodiments, generally relates to compositions, systems, and methods for the removal of at least one acid gas from a fluid gas stream. In particular, the present invention relates to compositions, systems, and methods for the removal of at least one acid gas from a fluid gas stream using a solution including an aminal compound (e.g. diethanolamine aminal).

An "acid gas" is a gas that can form acidic solutions when mixed with water. The most common acid gases are hydrogen sulfide ($H_2S$) and carbon dioxide ($CO_2$) gases. Additionally, as applied herein, "acid gas" includes mercaptans. Generally, the overall formula of mercaptans is R—SH, wherein R is a hydrocarbon chain. Example of mercaptans include, but are not limited to, methanethiol—$CH_3SH$ [methyl mercaptan], ethanethiol—$C_2H_5SH$ [ethyl mercaptan], 1-propanethiol—$C_3H_7SH$ [n-propyl mercaptan], 2-propanethiol—$CH_3CH(SH)CH_3$ [2C3 mercaptan], allyl mercaptan—$CH_2$=$CHCH_2SH$ [2-propenethiol], butanethiol—$C_4H_9SH$ [n-butyl mercaptan], tert-butyl mercaptan—$(CH_3)_3CSH$ [t-butyl mercaptan], pentanethiols—$C_5H_{11}SH$ [pentyl mercaptan], etc.

An aminal compound is a type of organic compound that has two amine groups attached to the same carbon atom. In a preferred embodiment, the present invention provides an aminal compound including diamine capable of scavenging the acid gases carbon dioxide, hydrogen sulfide, and/or mercaptan. This invention uses an aminal compound as provided in Formula 1 that is not sterically bound.

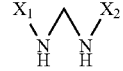

Figure 1

Wherein $X_1$ and $X_2$ may be the same or different alcohol or alkyl. Preferred alcohol groups include, but are not limited to, ethanol and methanol. Preferred alkyl groups include, but are not limited to methylene and ethylene. In a preferred embodiment, alkanol amines are used due to their high affinity for $CO_2$.

The aminal compound of Figure 1 is ideally suited for removing at least one acid gas, such as carbon dioxide, hydrogen sulfide, and/or at least one mercaptan, under both concentrated and dilute conditions. In one embodiment, the dilute conditions includes fluid gas streams having <10 wt. % acid gas, such as carbon dioxide. In one embodiment, the dilute conditions includes fluid gas streams having <5 wt. % acid gas, such as carbon dioxide. In another embodiment, the dilute conditions include fluid gas streams having <2 wt. % acid gas, such as carbon dioxide. The intramolecular interactions of the aminal compound with carbon dioxide are more efficient under varied conditions. In a preferred embodiment, the aminal compound is not a triazine or piperazine In a preferred embodiment, diethanolamineaminal is used as the aminal compound for scavenging at least one acid gas, such as carbon dioxide, hydrogen sulfide, and/or at least one mercaptan.

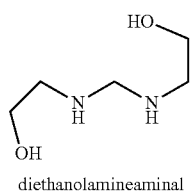

diethanolamineaminal

In another preferred embodiment, dimethyl aminal is used as the aminal compound for scavenging at least one acid gas, such as carbon dioxide, hydrogen sulfide, and/or at least one mercaptan.

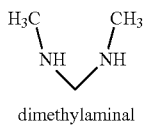

dimethylaminal

The aminal compound may be provided as a solvent system to the fluid gas stream. The solvent system may include, but is not limited to, monoethanolamine (MEA) and water. As such, the aminal compound may be provided as an aqueous aminal solution. As used herein, "an aqueous aminal solution" is intended to refer to a solution that includes an aminal compound in accordance with the present invention and water. The definition is not intended to exclude the inclusion of other solvents (for example alcohols) or other additives. Typically, the solution may contain from 90 to 40% (w/w) water, or 60 to 40% (w/w) water.

The aminal compound exhibits greater than predicted acid gas absorption capacity than found in standard alkanolamine solutions. In one embodiment of the present invention, at least one aminal compound reduces the concentration of at least one acid gas in a fluid gas stream by at least 20 wt. %, preferably by at least 25 wt. %, more preferably by at least 28 wt. %. In yet another embodiment of the present invention, at least one aminal compound reduces the concentration of at least one acid gas in a fluid gas stream by at least 20 wt. %, preferably by at least 25 wt. %, more preferably by at least 28 wt. % when the fluid gas stream includes<10 wt. %, or <5 wt. %, or <3 wt. % of the acid gas prior to contact with at least one aminal compound.

Example 1—Aminal Dialkanolamines Production

|  | MW | % | lbs | moles |
|---|---|---|---|---|
| MEA | 61.08 | 99.60 | 135080 | 999118.8007 |
| HCHO | 30.03 | 52.25 | 38314 | 302380.8105 |

Mole ratio HCHO:MEA=0.302648
135,850 lbs of MEA was loaded into a reactor, and then 38314 lbs of 52.25 wt. % formaldehyde was added. This produced an MEA aminal solution.

Example 2

A solution of 49.27 wt. % MEA aminal (the remainder water and MEA) was injected at a rate of 15 gallons per day into a 600 psi natural gas stream (216F). The natural gas stream, i.e. the fluid gas stream, contained 2.75 wt. % carbon dioxide and flowed at a rate of 119 MCF. Downstream of the MEA aminal addition, the carbon dioxide levels dropped to 2.05 to 2.15 wt. % percent carbon dioxide.

Under similar conditions the following compounds did not lower the concentration of carbon dioxide. As such, the following compounds are not included within the definition of aminal compound as provided herein:

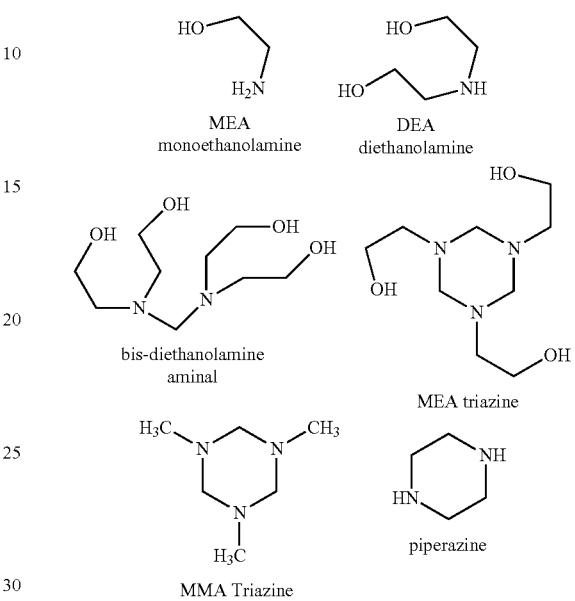

Example 3

A solution of 49 wt. % MEA aminal (the remainder water and MEA) was injected at a rate of 90 gallons per day into a 1000 psi natural gas stream. The gas stream contained 3.9 wt. % carbon dioxide and flowed at a rate of 365 MCF. Downstream of the MEA aminal addition, the carbon dioxide levels dropped to 2.8% carbon dioxide.

Although the present invention has been disclosed in terms of a preferred embodiment, it will be understood that numerous additional modifications and variations could be made thereto without departing from the scope of the invention as defined by the following claims:

We claim:
1. A method for reducing a concentration of at least one acid gas from a fluid gas stream comprises a step of injecting a solution including at least one aminal compound into said fluid gas stream, wherein said at least one aminal compound is an organic compound having two amine groups attached to the same carbon atom and said at least one aminal compound is not a triazine or piperazine, and wherein carbon dioxide is at least one acid gas that the concentration is reduced by said aminal compound.

2. The method of claim 1, wherein said at least one aminal compound is

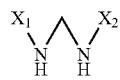

wherein $X_1$ and $X_2$ are the same or different alcohol or alkyl functional group.

3. The method of claim 2, wherein $X_1$ and $X_2$ are selected from the group consisting of ethyl alcohol, methyl alcohol, methyl, and ethyl functional group.

4. The method of claim 1 wherein said at least one acid gas further comprises at least one gas selected from the group consisting of hydrogen sulfide, mercaptans, and mixtures thereof.

5. The method of claim 1, wherein said at least one aminal compound is diethanol-amineaminal.

6. The method of claim 1, wherein said at least one aminal compound is dimethyl aminal.

7. The method of claim 1, wherein said solution is an aqueous solution including 90 to 50 wt % water.

8. The method of claim 1, wherein said fluid gas stream includes less than 10 wt. % of said at least one acid gas prior to injecting said solution including at least one aminal compound.

9. The method of claim 1, wherein said fluid gas stream includes less than 5 wt. % of said at least one acid gas prior to injecting said solution including at least one aminal compound.

10. A method for reducing the concentration of at least one acid gas from a fluid gas stream comprises the step of:
injecting an aqueous solution including at least one aminal compound into a fluid gas stream including less than 10 wt. % of said at least one acid gas to reduce the concentration of said at least one acid gas by at least 20 wt. %, and
wherein said at least one aminal compound is an organic compound having two amine groups attached to the same carbon atom and said at least one aminal compound is not a triazine or piperazine, and
wherein carbon dioxide is at least one acid gas that the concentration is reduced by said aminal compound.

11. The method of claim 10, wherein said at least one aminal compound is

wherein $X_1$ and $X_2$ are the same or different alcohol or alkyl functional group.

12. The method of claim 11, wherein $X_1$ and $X_2$ are selected from the group consisting of ethyl alcohol, methyl alcohol, methyl, and ethyl functional group.

13. The method of claim 10, wherein said fluid gas stream includes less than 5 wt. % of said at least one acid gas.

14. The method of claim 10, wherein said fluid gas stream includes less than 3 wt. % of said at least one acid gas.

15. The method of claim 10 wherein said aqueous solution includes 40-90 wt. % water.

16. The method of claim 10 wherein said aqueous solution includes 40-60 wt. % of said at least one aminal compound.

17. The method of claim 10 wherein said at least one aminal compound is diethanol-amineaminal.

18. The method of claim 10 wherein said at least one aminal compound is dimethyl aminal.

19. The method of claim 10 wherein said fluid gas stream is a natural gas stream.

* * * * *